E. WOERNER.
ADJUSTABLE CAM OPERATING MECHANISM.
APPLICATION FILED APR. 25, 1914.

1,147,910.

Patented July 27, 1915.

WITNESSES
M. A. Bill
C. B. Schroeder

INVENTOR
Eugen Woerner
By Pennie Davis & Hashney
Attys

UNITED STATES PATENT OFFICE.

EUGEN WOERNER, OF STUTTGART, GERMANY, ASSIGNOR TO THE FIRM OF ROBERT BOSCH, OF STUTTGART, GERMANY.

ADJUSTABLE CAM-OPERATING MECHANISM.

1,147,910.  Specification of Letters Patent.  Patented July 27, 1915.

Application filed April 25, 1914.  Serial No. 834,390.

*To all whom it may concern:*

Be it known that I, EUGEN WOERNER, engineer, a subject of the Emperor of Germany, residing at 28 Lerchenstrasse, Stuttgart, Germany, have invented certain new and useful Improvements in Adjustable Cam-Operating Mechanism; and I do hereby declare the following to be a full, clear, and exact description of the invention, such as will enable others skilled in the art to which it appertains to make and use the same.

The present invention discloses cam mechanism suitable for a variety of purposes, as, for example, for driving the pistons of lubricating pumps for internal combustion engines and for driving fuel pumps for engines of the Diesel type, wherein the stroke of the pistons may be varied by hand or automatically by the fuel regulating mechanism. For this purpose I provide two cam actuating surfaces capable of relative adjustment, so that an oscillatory member coöperative with the actuating surfaces may be swung or reciprocated between adjustable limits. Preferably, I provide two rotatable cam disks in axial alinement, one being fixed in position to determine the fixed limit in one direction of travel of the oscillatory member, and the other cam disk being axially movable between limits to vary the travel of the oscillatory member in the other direction. However, if desired, both cam disks may be adjustable so that the throw or travel in either or both directions may be varied, or the stroke may be varied in space without being varied in amount. The adjusting mechanism for varying the axial separation of the actuating surfaces is such that the relative angular position of the two actuating surfaces is maintained at all points of adjustment.

Figure 1:
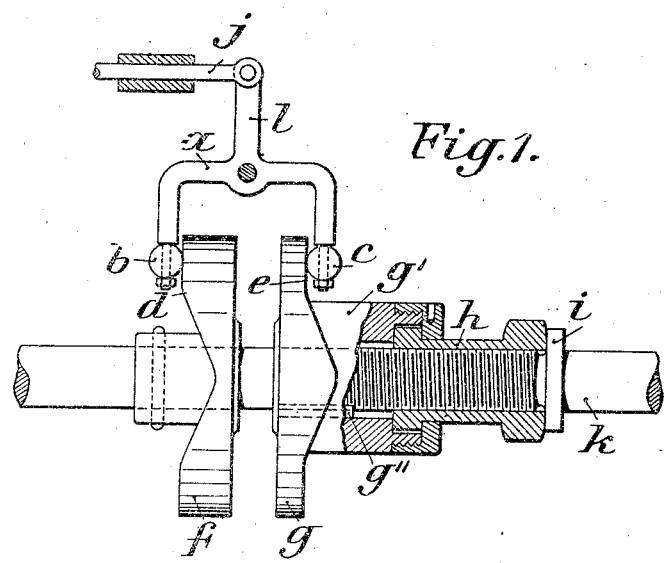
Figure 2:
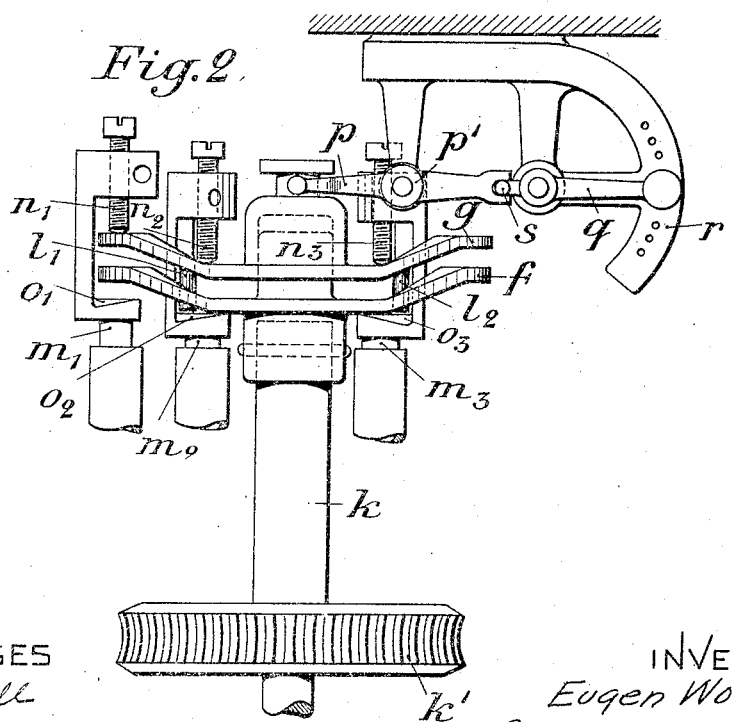

In the accompanying drawings, illustrating my invention, Figure 1 shows a side view of adjustable cam mechanism for operating a connecting rod; and Fig. 2 shows a side view of adjustable cam mechanism for operating the pistons of circularly arranged lubricating pumps.

In Fig. 1 the fork $a$ carries the rollers $b$ and $c$ in driving engagement with the actuating surfaces $d$ and $e$ of the cam disks $f$ and $g$. These actuating surfaces are provided with elevated and depressed portions relatively arranged with respect to one another so that an elevated portion of one disk is in axial alinement with a correspondingly depressed portion of the other disk, and vice versa. Thus, when the roller $c$ rides upon an elevated portion of the cam disk $g$, the roller $b$ rides into the axially disposed depressed portion of the cam disk $f$, and the lever $l$ is thereby forced to the right. The cam disk $f$ is pinned to the shaft $k$ as shown, but the cam disk $g$ is movable axially of the shaft by means of the threaded sleeve $h$, which engages the threads on the shaft and turns loosely in the hub $g'$. The feather and groove connection $g''$ between the cam disk $g$ and the shaft $k$ maintains the relative angular position of the two cam disks at all adjustments. When the cam disks $f$ and $g$ have the greatest separation (as illustrated in Fig. 1) both the rollers $b$ and $c$ contact at all times with the two actuating surfaces. The collar $i$ fixed on the shaft $k$ prevents the cam disk $g$ from being moved to a position of greater separation, so as to preclude the possibility of disrupting the fork $a$. When the two cam disks are separated by an amount less than that shown in Fig. 1, but one of the rollers $b$, $c$ contacts at a time with an actuating surface, while the other roller is then separated from its actuating surface. In this way, the stroke of the lever $l$, and consequently the stroke of the rod $j$ may be varied by turning the sleeve $h$ and thereby altering the separation of the actuating surfaces of the two cam disks.

In Fig. 2, the driving shaft $k$ is arranged to be driven in any suitable way, as, for instance, by the worm gear $k'$. The lower cam disk $f$ is pinned to the shaft $k$, while the upper cam disk $g$ is movable axially of the other cam disk on the hub thereof. The pins $l_1$, $l_2$ extend from the cam disk $g$ into holes in the cam disk $f$, so as to maintain the angular relation of the two cam disks at all adjusted positions of separation. The pump pistons $m_1$, $m_2$, $m_3$ are arranged in a circle about the driving shaft $k$, and each pump piston carries a fork having an adjustable screw $n_1$, $n_2$ or $n_3$ on its upper arm and an engaging surface $o_1$, $o_2$ or $o_3$ on its lower arm, the actuating surfaces of the cam disks being embraced by the two arms of each fork. The mechanism for varying the axial separation of the two cam disks comprises the yoke $p$ pivoted at $p_1$ and engaging at $s$ the adjustable handle $q$, which is adapted to lightly engage the holes in the bracket r and to be held disengageably in position thereby. Thus by moving the handle q, the upper cam disk g is moved axially of the cam disk f to vary the separation between the actuating surfaces thereof. When the handle q is moved to its lowermost position in Fig. 2, the two cam disks are in contact with each other and the stroke of each piston is then zero, but as the handle is brought upwardly from this position, the stroke of each piston is gradually increased in amount.

It will be apparent that if the cam disk f in Fig. 1 or Fig. 2 is made axially movable also, then the limit of travel of the lever m to the left in Fig. 1, or the limit of downward travel of the pistons in Fig. 2, may be varied as well as the limit of travel in the other direction in each case. In addition to changing the limits of the stroke in both directions, the zone in which the oscillatory member moves may also be changed by having both of the cam disks axially adjustable in position.

Instead of operating the handle q by hand, it may be arranged to be automatically operated by connecting it to a moving part of the engine or the machine associated with the cam operating mechanism. For instance, the handle may be connected to the regulator of an engine of the Diesel type for the purpose of automatically adjusting the fuel delivered to the engine cylinders in accordance with the position of the governor mechanism of the engine; or the handle may be connected to the mechanism for regulating the amount of gas delivered to an internal combustion engine and thereby regulate the amount of lubricating oil delivered to the engine in accordance with the power developed by the engine and thereby prevent an excessive feed of lubricating oil and an excessive amount of oil in the exhaust.

Having thus described my invention, what I claim is:

1. In adjustable cam operating mechanism, axially-separable rotatable cam disks having actuating surfaces outwardly disposed in axial direction, and a yoke having inwardly facing contact surfaces engageable with the actuating surfaces for positive movement of the yoke in two directions.

2. In adjustable cam operating mechanism, axially-separable rotatable cam disks having actuating surfaces outwardly disposed in axial direction, a plurality of circularly disposed yokes provided each with inwardly facing contact surfaces engageable with the actuating surfaces for positively reciprocating the yoke, and adjusting means for adjusting the axial separation of the cam disks to vary in like amount the stroke of all the yokes.

3. In adjustable cam operating mechanism, axially-separable rotatable cam disks having actuating surfaces outwardly disposed in axial direction, and a plurality of yokes provided each with inwardly facing contact surfaces engageable with the actuating surfaces for positively reciprocating the yoke, the axial separation of the contact surfaces of each yoke being independently adjustable for independently adjusting the stroke thereof.

4. In adjustable cam operating mechanism, rotatable cam mechanism having axially-separable actuating surfaces, and adjusting mechanism coöperative with the cam mechanism during rotation thereof to vary the axial separation of the actuating surfaces.

5. In adjustable cam operating mechanism, a rotatable shaft, two cam disks mounted thereon, one being fastened to the shaft and the other being rotatively connected to the shaft and freely slidable therealong during rotation, and adjusting mechanism coöperative with the slidable disk during rotation thereof to vary the axial separation of the two disks.

6. In adjustable cam operating mechanism, axially-separable rotatable cam disks having actuating surfaces outwardly disposed in axial direction, one of the cam disks being fixed in axial position and the other being freely movable in axial direction during rotation, adjusting mechanism coöperative with the axially movable disk to vary the axial separation of the two disks, and a yoke having inwardly facing contact surfaces coöperative with the actuating surfaces.

In testimony whereof I affix my signature, in presence of two witnesses.

EUGEN WOERNER.

Witnesses:
 PAUL WOLFART,
 REINHOLD ELWERT.